United States Patent Office 2,694,616
Patented Nov. 16, 1954

2,694,616

PREPARATION OF FLUORIDES OF TITANIUM AND ALKALI METALS

Eugene Wainer, Cleveland Heights, Ohio, assignor, by mesne assignments, to Horizons Titanium Corporation, Princeton, N. J., a corporation of New Jersey No Drawing. Application January 31, 1952, Serial No. 269,142

4 Claims. (Cl. 23—88)

Compound fluorides of titanium and alkali metals, and particularly potassium titanium fluoride, are of importance in the metallurgy of aluminum, magnesium, and titanium. The relatively high cost of these compounds, however, has been a hindrance to expanded usage. An economical process for preparing these compounds would be of considerable importance. Heretofore, the usual method has involved dissolving a relatively pure oxide of titanium in hydrofluoric acid and subsequently adding potassium fluoride and precipitating the relatively insoluble potassium titanium fluoride. The compound is then purified by recrystallization, by virtue of its low solubility in water at low temperatures. The process uses expensive and corrosive chemicals, and specialized equipment is required, and hence the product is of high cost. In accordance with the present invention, these compounds may be produced in a manner eliminating such difficulties, and correspondingly affording products at more reasonable cost. Other objects and advantages will appear from the following description.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

In general, the present novel method involves the initial formation of an alkali metal titanate, as distinguished from the initial formation of an alkaline earth metal titanate as described and claimed in the copending application of Samuel Z. Cardon and myself, Serial No. 292,743, filed June 10, 1952, and then this alkali metal titanate is reacted with a fluoride and mineral acid, and the fluoride of titanium and alkali metal formed is recovered and recrystallized. The alkali titanate is formed by reaction by ordinary temperature chemical means or by calcination of a titanium compound with a suitable alkali metal compound at elevated temperatures.

Suitable titanium compounds for the purposes of this invention are the pure oxide, impure oxides such as natural rutile or titania developed from the residue type of chemical preparation of titanium dioxide from ilmenite, meta-titanic acids and slags containing high percentages of $TiO_2$. Of the various alkali metal compounds, suitable instances are the hydrates, carbonates, sulphates, and nitrates of the alkali metals. The alkali metal carbonates are particularly preferred, but the sulphates are also very effective. The choice is a question of economics. A particularly useful type of alkali metal compound is the so-called agricultural grade of potassium sulphate, which contains 90–95 per cent potassium sulphate content, the balance being either compounds of sodium and silicates or both.

For preparing the alkali metal titanate, as the first operation, the chemical procedure may involve reaction between meta-titanic acid and the hydrate or carbonate of the alkali metal. Generally, however, it is more desirable to use calcination, an alkali metal compound being heated with a compound of titanium at temperatures in the range varying from 1700° F. up to 2200° F. In this case, a calcine or sinter is obtained in which the titanium has been transferred into an alkali metal titanate. For reasons to be explained hereinafter, the amounts of the alkali metal compound should be in excess of the one to one molar ratio relative to $R_2O$ versus $TiO_2$. The amount of excess will vary between 2 and 5 per cent. The use of such excess of alkali metal compound is important for the subsequent purification reactions.

Calcination of the alkali compound and the titanium compound should be in neutral atmosphere. And I prefer to include finely divided carbon, such as petroleum coke, in the mixture in amount about 20 parts per 100 parts of alkali metal compound. The various derivatives of the alkalies decompose giving off gases such as water, carbon dioxide, sulphur trioxide, nitric oxide, etc. from the starting material. When relatively impure titanium dioxides are used, sufficient alkali metal is used to compensate for the impurities which in the case of rutile are chiefly silica.

The temperature of calcination ranges from roughly 1700° F. up to about 2200° F. and the preferred temperature range is 1900–2000° F. Generally, the calcine is maintained at these temperatures for at least an hour, and the end point of the reaction is usually determined by the cessation of evolution of gas.

After calcination, the alkali titanate obtained is crushed and dry ground to —200 mesh. The titanate compound is then put in an acid proof container, e. g. rubber-lined, and slurried with water and preferably a catalyst, such as a catalytic amount of available Cl. ion, e. g. as KCl, is added. A finely ground fluoride preferably of alkaline earth, such as fluorspar, generally less than —200 mesh fine and proper quantity is added, and if necessary further water is added to maintain a thin slurry. Of the alkaline earth fluorides calcium fluoride is preferred because of lower cost. To the rapidly stirred slurry, a concentrated mineral acid is added slowly, continuing the stirring. Suitable mineral acids are hydrochloric, nitric, sulphuric, phosphoric, etc., but of these sulphuric and phosphoric are preferred for reasons noted hereinafter. The amount of acid used is always such that the pH of the stirred solution remains on the acid side and not allowed to rise much above pH 5. A pH of 3–5 is preferred.

The addition of the mineral acid evolves a considerable amount of heat and after all the acid has been added, the solution is stirred for a period of 10 to 15 minutes and then the temperature is raised to the boiling point at which point it is digested for at least 20 to 30 minutes, again making certain that the pH remains in the range of 3 to 5 which may or may not require the addition of slight amounts of further acid.

Under these conditions and with sufficient water contents, the general end product of the reaction is the alkali titanium fluoride, preferably the potassium derivative which goes into solution at the boiling point of water, and a precipitate of the sulphate of calcium or the phosphate of calcium is formed in crystalline and rapidly filterable condition. If the digestion is continued for sufficient long period, these crystals become quite coarse and this is particularly true if the reaction remains slightly on the acid side. At this stage, the crystals of calcium sulphate or of calcium phosphate as the case may be are separated from the liquor by hot filtration through a suitable filter medium such as stainless steel screen, glass filter cloth, or the like. The crystals are washed on the filter with hot water containing a trace of acid to remove all residual potassium titanium fluoride.

The hot liquor containing the desired compound is clarified while hot is desired, and the clear filtrates are then concentrated by evaporation until the first evidences of precipitation are observed. If this concentration is carried out with the solution either on the basic side or in the absence of a slight excess of potassium fluoride, then a hydrated titanium fluoride will form which contains fixed oxygen in the crystal system. The presence of the two conditions just indicated prevents the development of this complication. As soon as the first crystal is formed from the liquor, the concentrated solution is allowed to cool and crystallize spontaneously at room temperature. After standing for several hours, the crystals are dewatered on a filter. If desired, these crystals may be purified by a second crystallization from hot water which again contains a small excess of potassium fluoride. This second crystallization provides a substantially pure chemical compound.

The yields obtained from the procedures as described above are generally in excess of 90 per cent and if the precipitating solutions are concentrated properly before precipitation, an expectation of yields in excess of 95 per cent is invariably afforded.

The following examples are illustrative of my method:

*Example 1.*—145 grams of potassium carbonate is thoroughly mixed with 60 grams of pigment grade titanium dioxide plus some fine carbon as afore-described. The mixed batch is put in a clay crucible and heated at 1800° F. for one hour. This calcination is in neutral atmosphere and the crucible is heated up to temperature and the time of calcination is counted from that point to make certain that the heat penetrates throughout the batch. After cooling, the sintered calcine is crushed and dry ground to —200 mesh. It is then put in a rubber-lined container and dispersed in 2000 cc. of water, and 5 to 10 grams of KCl and 235 grams of pure calcium fluoride of particle size less than 200 mesh are also added. If the acid grade type of natural fluorspar is used, the calcium fluoride content will vary between 90 and 95 per cent, and the amount of fluorspar added should be increased to compensate for this deficiency in calcium fluoride content. The batch is stirred vigorously until it is certain that mixture is complete and then 322 grams of sulphuric acid of specific gravity 1.82 is added dropwise to the rapidly stirring solution so that the addition occurs over a period of about 15 minutes. The addition of sulphuric acid institutes a thickening reaction and the temperature of the batch rises. As soon as all the sulphuric acid has been added, stirring should be continued for about 10 minutes of the hydrogen ion concentration checked. If the pH is more alkaline than 5, enough further sulphuric acid should be added to reduce the pH into the range 3 to 5. Usually no further sulphuric acid is required and at most only small quantities of the order of a few grams are needed. After this digestion period in the warm solution, the slurry is heated to the boiling point of water through the injection of steam and is maintained at the boiling point with continued stirring for about half an hour. Examination of the slurry shows that a highly crystalline compound has been formed in which the crystals are needle-like and quite coarse. The slurry is then filtered through a stainless steel screen and the crystals obtained are washed on the filter with water containing a trace of sulphuric acid. The cloudy liquid is allowed to stand for a few minutes, which is sufficient for the liquor to clarify. The clarified liquor is decanted into a crystallizing tank and concentrated by evaporation. At this stage, that is before concentration, the total volume of solution is of the order of 3000 to 3500 cc. On evaporation to a volume between 700 and 800 cc., the first evidence of precipitation takes place. The saturated liquor is removed from the crystallizer and allowed to cool to room temperature, at which a coarse glistening white well-formed crystal is obtained. The batch of crystals is dewatered and examined for purity. If the impurity content is too high, the crystals are redissolved in 1000 cc. of hot water to which has been added a trace of sulphuric acid and an amount of potassium fluoride equivalent to about 0.5 per cent of the total solution, that is roughly 5 grams of potassium fluoride are required. The solution is again heated to boiling and clarified if necessary. The clear liquor is concentrated as before and allowed to crystallize. The crystal batch is dewatered, washed two or three times with wash water containing a trace of sulphuric acid and potassium fluoride, and is then dried at 150° C. With a single crystallization, the yield is 230 grams of potassium titanium fluoride and with a double crystallization, the yield is usually of the order of 220 grams.

*Example 2.*—Same as in Example 1 except that 185 grams of potassium sulphate are used in place of potassium carbonate. In this case, the calcination temperature is 2100° F., all of the conditions remaining roughly the same. Again yield comparable to those obtained in Example 1 are in evidence.

*Example 3.*—Same as in Example 1 except that 220 grams of potassium acid carbonate were used. Otherwise the conditions and yields are substantially identical with those obtained in Example 1.

*Example 4.*—Same as in Example 1 except that 67 grams of —325 natural rutile having a titanium content of 90 per cent are used in place of the 60 grams of pure precipitated titanium dioxide. In this case, a yield of 225 grams of potassium titanium fluoride are obtained.

*Example 5.*—Same as Example 1 except that phosphoric acid is used in place of sulphuric acid. In this case, 275 grams of 75 per cent phosphoric acid are required. 220 grams of potassium titanium fluoride are obtained.

*Example 6.*—Same as Example 1 except that 86 grams of titania slag containing 70 per cent $TiO_2$ is used. This titania slag contains minor quantities of $Fe_2O_3$, $Al_2O_3$, and $SiO_2$. 175 grams of $K_2CO_3$, 250 grams of $CaF_2$ and 350 grams of $H_2SO_4$ are the amounts of the other reactants required. Otherwise the procedure is the same as in Example 1 and 225 grams of potassium titanium fluoride are obtained.

Other modes of applying the principle of the invention may be employed, change being made as regards the details described, provided the feature stated in any of the following claims or the equivalent of such be employed.

I therefore particularly point out and distinctly claim as my invention:

1. The method of producing a double fluoride of titanium and an alkali metal from an oxidic titanium compound which comprises calcining the oxidic titanium compound and an alkali metal compound, crushing the calcine and slurrying it in water with a finely divided alkaline earth metal fluoride and a mineral acid, boiling the slurry to formation of said double fluoride in solution, filtering out insoluble by-product material, then concentrating the separated hot solution, and cooling the concentrated solution to effect crystallization therefrom of said double fluoride.

2. The method of producing a double fluoride of titanium and potassium from an oxidic titanium compound which comprises calcining the oxidic titanium compound and a potassium compound, crushing the calcine and slurrying it in water with finely divided calcium fluoride and sulphuric acid to a pH of 3–5, boiling and digesting the slurry to formation of the potassium titanium double fluoride in solution, filtering off the resulting calcium sulphate, then concentrating the separated hot solution, and cooling the concentrated solution to effect crystallization therefrom of said double fluoride.

3. The method of producing an alkali metal-titanium double fluoride from an oxidic titanium compound which comprises calcining the oxidic titanium compound with an alkali metal compound, reacting the resulting alkali metal titanate with an alkaline earth metal fluoride in an aqueous medium in the presence of an amount of a mineral acid sufficient to impart to the reaction mass a pH not substantially higher than 5, and recovering the alkali metal-titanium double fluoride from the resulting aqueous medium.

4. The method of producing an alkali metal-titanium double fluoride from an oxidic titanium compound which comprises calcining the oxidic titanium compound with an alkali metal compound in the presence of up to about 20 parts of carbon per 100 parts of said alkali metal compound, reacting the resulting alkali metal titanate with an alkaline earth metal fluoride in an aqueous medium in the presence of an amount of a mineral acid sufficient to impart to the reaction mass a pH not substantially higher than 5, and recovering the alkali metal-titanium double fluoride from the resulting aqueous medium.

References Cited in the file of this patent

UNITED STATES PATENTS

| Number | Name | Date |
|---|---|---|
| 2,577,130 | Kawecki | Dec. 4, 1951 |

OTHER REFERENCES

"Titanium," by Jelks Barksdale, page 98. The Ronald Press Company, New York.